Oct. 14, 1930.   G. DE MONGE   1,778,663
INTERNAL COMBUSTION ENGINE
Filed Feb. 7, 1928
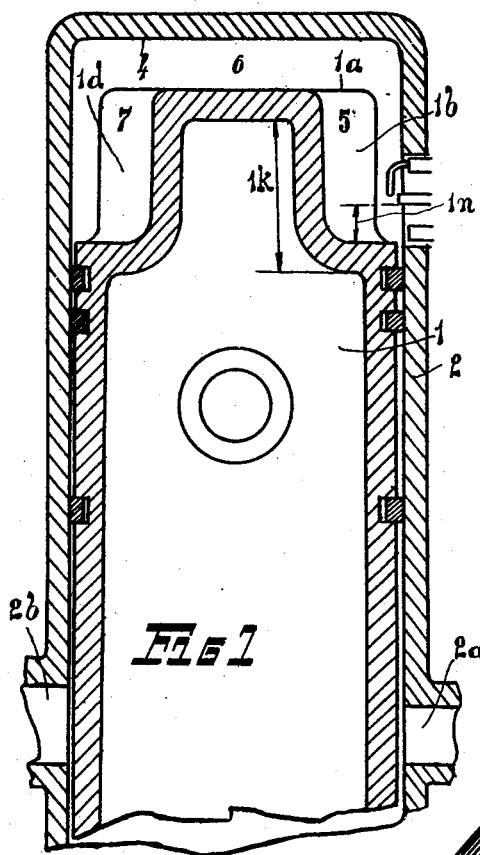
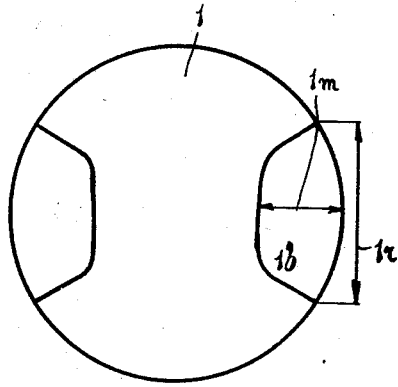
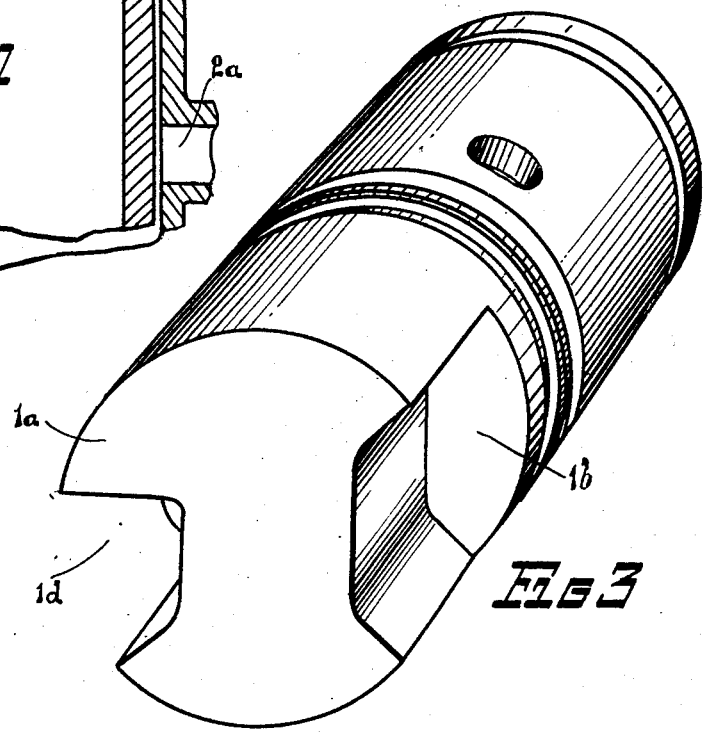
INVENTOR
Gérard de Monge Patented Oct. 14, 1930

1,778,663

UNITED STATES PATENT OFFICE

GÉRARD DE MONGE, OF BRUSSELS, BELGIUM

INTERNAL-COMBUSTION ENGINE

Application filed February 7, 1928, Serial No. 252,605, and in Belgium February 11, 1927.

This invention relates to an internal combustion engine and more particularly refers to two stroke engines.

The object of the invention is to obtain regular explosions on two strokes with a very low inlet rate.

Incoming mixture is, at the inlet, thrown in a compact jet to the cylinder head. To this effect, the mixture is led through a channel which may be formed by the piston and is, for example, made by a hollow in the piston, parallel to the axis of the cylinder, and the cylinder wall.

According to the invention, a piston may have a practically flat top, without deflector, with two hollows or channels corresponding respectively to the inlet and exhaust ports at bottom dead centre.

The height of the channels will be at least four tenths of the diameter of the cylinder; their width will be about the same as that of the corresponding inlet or exhaust port; their depth will be such that the total surface of the two channels, seen on a ground plan, will be equal or inferior to two fifths of the total surface of the cylinder seen on the same plane.

To allow the working on two strokes, even with a very low inlet rate, the invention provides for the explosion to take place in a small reserve of fresh gas carried by the piston. This reserve can be contained in the bottom of the inlet channel. To this effect, the sparking plug will be situated on the inlet side and placed, at top dead centre, at a distance of the bottom of the channel equal to or inferior to half height of this channel.

The drawings are given as examples of one form of the invention but are not limitative of this invention.

Figure 1 shows a section of the cylinder with the piston at top dead centre.

Figure 2 gives a ground plan of the piston.

Figure 3 shows a perspective of the piston with a different form of the channel or hollow.

The piston is a cylindrical piece 1 of the type used for hollow pistons; it has a flat top and two recesses $1^b$ and $1^d$ opening towards the head. The channels $1^b$ and $1^d$ are opposite to the inlet and exhaust ports $2^a$ and $2^b$ and, at dead bottom centre, their base is level with the bottom side of the corresponding port.

The above mentioned recesses form, with the cylinder wall, two channels practically parallel to the axis of the cylinder.

At the intake, fresh mixture arriving through the inlet port is led, through the channel thus formed and thrown in a compact jet against the cylinder head where it spreads.

The intake continuing increases the volume of the fresh mixture which comes down towards the piston head, driving out the exploded mixture through the opposite channel and the exhaust port opened at the same time as the inlet port.

At a high rate of intake, the incoming gases reach the exhaust channel or the exhaust port. With a very low intake rate, incoming gases do not reach the cylinder head; they remain confined in the inlet channel and thus form a reserve which is carried up by the piston.

This arrangement assures a good scavenging of the cylinder and avoids the exhaust of incoming gas before the exploded mixture is driven out; it also allows a higher rate of compression to be reached without any complicated mechanism.

The channels may have any form desired, but the invention specially provides for the application to these recesses of the following dimensions:

The height $1^k$, parallel to the axis of the cylinder, must be equal or superior to four tenths of the diameter of the cylinder.

The width $1^r$ will be equal to that of the corresponding port. If the ports are subdivided, the channels will be divided in the same manner.

The depth $1^m$ will be such that the total surface, on a plan view, of the recesses will be equal or inferior to two fifths of the total surface of the piston head.

The sparking plug, fitted on the inlet side, will, at dead top centre, be placed at the bottom of the channel. The vertical distance $1^n$ from the bottom of the channel to the centre line of the plug must be less than half the height $1^k$ of the channel.

When the piston is at top dead centre, the compression chamber is divided into three compartments formed by: (1) the first 5 by the inlet channel $1^b$ and the cylinder wall 2, (2) the second 6 by the piston head and the cylinder top 4, (3) the third 7 by the exhaust channel and the cylinder wall 2.

With a low inlet rate, compartments 7 and 6 are completely filled up with exploded mixture; compartment 5 only will contain fresh gas which will be driven, during compression, to the bottom of the channel.

Under these conditions, the spark will flash in pure fresh gas and avoid misfiring. This result will be attained by placing the plug, at top dead centre, at the height stated previously.

What I claim is:

In an internal combustion engine, having a cylinder wall, an ignition system and intake passages, and admission and exhaust ports for cylinders, a piston having a flat bottom and having two cavities in its side face which form with the wall of the cylinder, two narrow passages of equal length, cooperating one with the admission port and the other with the exhaust port, a spark plug cooperating with the intake port and adapted to reach the base of the intake passage when the piston is at the dead centre on the explosion side, these passages having a length greater than the length of the maximum advance of ignition for the motor in question, so that the ignition may take place in the combustion chamber at a selected instant of a very large portion of the final ascending path of the piston.

In testimony whereof I have affixed my signature.

GÉRARD de MONGE.